(12) United States Patent
Jiang et al.

(10) Patent No.: US 11,643,588 B2
(45) Date of Patent: May 9, 2023

(54) MULTIPLE FUNCTIONAL WELLBORE FLUID ADDITIVE

(71) Applicant: Hexion Inc., Columbus, OH (US)

(72) Inventors: Li Jiang, Katy, TX (US); Jan Beetge, Pearland, TX (US); Fenglou Zou, Edmonton (CA)

(73) Assignee: HEXION INC., Columbus, OH (US)

( * ) Notice: Subject to any disclaimer, the term of this patent is extended or adjusted under 35 U.S.C. 154(b) by 141 days.

(21) Appl. No.: 15/830,553

(22) Filed: Dec. 4, 2017

(65) Prior Publication Data

US 2019/0169484 A1 Jun. 6, 2019

(51) Int. Cl.
| | |
|---|---|
| *C04B 14/02* | (2006.01) |
| *C04B 24/26* | (2006.01) |
| *C04B 24/34* | (2006.01) |
| *C04B 28/02* | (2006.01) |
| *C09K 8/487* | (2006.01) |
| *E21B 21/00* | (2006.01) |
| *E21B 33/14* | (2006.01) |
| *C09K 8/035* | (2006.01) |
| *C09K 8/03* | (2006.01) |
| *C09K 8/467* | (2006.01) |
| *C04B 40/00* | (2006.01) |
| *C04B 103/40* | (2006.01) |
| *C04B 103/46* | (2006.01) |

(52) U.S. Cl.
CPC .......... *C09K 8/487* (2013.01); *C04B 14/022* (2013.01); *C04B 24/2623* (2013.01); *C04B 24/2688* (2013.01); *C04B 24/34* (2013.01); *C04B 28/02* (2013.01); *C04B 40/0039* (2013.01); *C09K 8/032* (2013.01); *C09K 8/035* (2013.01); *C09K 8/467* (2013.01); *E21B 21/003* (2013.01); *E21B 33/14* (2013.01); *C04B 2103/40* (2013.01); *C04B 2103/46* (2013.01)

(58) Field of Classification Search
None
See application file for complete search history.

(56) References Cited

U.S. PATENT DOCUMENTS

| | | |
|---|---|---|
| 3,228,907 A | 1/1966 | Eash |
| 3,375,873 A | 4/1968 | Farris |
| 3,662,830 A | 5/1972 | Martin |
| 3,821,985 A | 7/1974 | George |
| 4,047,567 A | 9/1977 | Childs et al. |
| 4,065,318 A | 12/1977 | Detroit et al. |
| 4,151,150 A | 4/1979 | Meyer et al. |
| 4,296,813 A | 10/1981 | Detroit et al. |
| 4,441,887 A | 4/1984 | Funk |
| 4,537,918 A | 8/1985 | Parcevaux et al. |
| 4,569,395 A | 2/1986 | Carpenter |
| 4,601,758 A | 7/1986 | Nelson |
| 4,700,780 A | 10/1987 | Brothers |
| 4,806,164 A | 2/1989 | Brothers |
| 4,926,944 A | 5/1990 | Schilling |
| 5,012,870 A | 5/1991 | Schilling |
| 5,093,449 A | 3/1992 | Durney et al. |
| 5,101,902 A | 4/1992 | Parcevaux et al. |
| 5,124,312 A | 6/1992 | Wang |
| 5,149,370 A | 9/1992 | Olaussen et al. |
| 5,252,128 A | 10/1993 | Gopalkrishnan |
| 5,258,072 A | 11/1993 | Gopalkrishnan et al. |
| 5,258,428 A | 11/1993 | Gopalkrishnan |
| 5,262,452 A | 11/1993 | Gopalkrishnan |
| 5,300,542 A | 4/1994 | Gopalkrishnan |
| 5,370,181 A | 12/1994 | Nahm et al. |
| 5,401,786 A | 3/1995 | Gopalkrishnan |
| 5,472,051 A | 12/1995 | Brothers |
| 5,679,731 A | 10/1997 | Rodriguez |
| 5,728,210 A | 3/1998 | Moran et al. |
| 5,753,037 A | 5/1998 | Franz et al. |
| 5,850,880 A | 12/1998 | Moran et al. |
| 5,874,387 A | 2/1999 | Carpenter et al. |
| 5,883,054 A | 3/1999 | Hernandez et al. |
| 5,975,220 A | 11/1999 | Mueller et al. |
| 5,988,279 A | 11/1999 | Udarbe et al. |
| 6,085,840 A | 7/2000 | Laramay et al. |
| 6,089,318 A | 7/2000 | Laramay et al. |
| 6,136,935 A | 10/2000 | Udarbe et al. |
| 6,270,565 B1 | 8/2001 | Heathman |
| 6,372,037 B1 * | 4/2002 | Lebo, Jr. ................. C04B 24/18 106/677 |
| 6,391,952 B1 | 5/2002 | Bett et al. |
| 6,562,122 B2 | 5/2003 | Vijn et al. |
| 6,730,637 B1 | 5/2004 | Stewart et al. |
| 6,776,237 B2 | 8/2004 | Dao et al. |
| 6,902,001 B2 | 6/2005 | Dargaud et al. |
| 6,953,050 B2 | 10/2005 | Cavagna |
| 6,964,302 B2 | 11/2005 | Luke et al. |
| 7,073,585 B2 | 7/2006 | Morgan et al. |
| 7,226,895 B2 | 6/2007 | Xiang |
| 7,285,166 B2 | 10/2007 | Luke et al. |
| 7,368,490 B2 | 5/2008 | Patel et al. |
| 7,384,892 B2 | 6/2008 | Melbouci et al. |
| 7,384,893 B2 | 6/2008 | Morgan et al. |
| 7,384,894 B2 | 6/2008 | Morgan et al. |

(Continued)

FOREIGN PATENT DOCUMENTS

| | | |
|---|---|---|
| GB | 1484057 | 8/1977 |
| KR | 101489653 | 2/2015 |
| WO | WO2014196618 | 12/2014 |

*Primary Examiner* — Charles R Nold

(57) ABSTRACT

The embodiments described herein generally relate to methods and chemical compositions for use with wellbore treatment processes. In one embodiment, a composition is provided comprising a cementitious material, a drilling fluid, or combinations thereof, and an additive composition comprising one or more components selected from the group of an aqueous insoluble lignin, a coke fine, a random tetracopolymer having the formula styrene-butadiene-acrylic-fumaric acid, a polyvinyl acetate, a surfactant composition, and combinations thereof.

10 Claims, No Drawings

(56) References Cited

U.S. PATENT DOCUMENTS

| | | | |
|---|---|---|---|
| 7,449,430 B2 | 11/2008 | Guichard et al. | |
| 7,530,396 B1 | 5/2009 | Reddy et al. | |
| 7,784,542 B2 | 8/2010 | Roddy et al. | |
| 7,971,644 B2 | 7/2011 | Ladva et al. | |
| 8,020,618 B2 | 9/2011 | Barlet-Gouedard et al. | |
| 8,053,394 B2 | 11/2011 | Xiang et al. | |
| 8,157,009 B2 | 4/2012 | Patil et al. | |
| 8,393,391 B2 | 3/2013 | Willimann et al. | |
| 8,529,694 B2 | 9/2013 | Herschke et al. | |
| 8,598,093 B2 | 12/2013 | Roddy et al. | |
| 8,623,791 B2 | 1/2014 | Yang et al. | |
| 8,710,131 B2 * | 4/2014 | Bergman | C08F 2/20 524/105 |
| 8,741,817 B2 | 6/2014 | Tarafdar et al. | |
| 8,962,710 B2 | 2/2015 | Michaux et al. | |
| 9,006,152 B2 | 4/2015 | Patil et al. | |
| 9,181,130 B2 | 11/2015 | Dombrowski et al. | |
| 2009/0029878 A1 | 1/2009 | Bicerano | |
| 2009/0032252 A1 | 2/2009 | Boney et al. | |
| 2011/0056752 A1 | 3/2011 | Young et al. | |
| 2011/0094746 A1 | 4/2011 | Allison et al. | |
| 2012/0138299 A1 | 6/2012 | Joseph et al. | |
| 2012/0231980 A1 | 9/2012 | Zhang et al. | |
| 2014/0051606 A1 | 2/2014 | Dobson et al. | |
| 2014/0238676 A1 | 8/2014 | Carelli et al. | |
| 2014/0367104 A1 | 12/2014 | Michaux et al. | |
| 2015/0191644 A1 | 7/2015 | Patil et al. | |
| 2015/0252243 A1 | 9/2015 | Ojong-Besong et al. | |
| 2015/0275065 A1 | 10/2015 | Murphy et al. | |
| 2016/0137903 A1 | 5/2016 | Friedhelm et al. | |
| 2018/0022981 A1 | 1/2018 | Li et al. | |
| 2018/0230357 A1 | 8/2018 | Haydon et al. | |
| 2019/0112228 A1 * | 4/2019 | Ozersky | C04B 20/1066 |

\* cited by examiner

MULTIPLE FUNCTIONAL WELLBORE FLUID ADDITIVE

FIELD OF THE INVENTION

The present invention relates to compositions and products for wellbore treatment processes, in particular, as additives to cementing compositions and drilling fluids used in wellbore treatment processes.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, for example, casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Cement compositions are commonly utilized in subterranean operations, particularly subterranean well completion and remedial operations. For example, cement compositions are deployed in primary cementing operations whereby pipe strings such as casings and liners are cemented in well bores. In performing primary cementing, cement compositions are pumped into the annular space between the walls of a well bore and the exterior surface of the pipe string disposed therein. The cement composition is permitted to set in the annular space, thereby forming an annular sheath of hardened, and hence substantially impermeable, cement therein that supports the pipe string in the center of the well bore and at the same time bonds the exterior surfaces of the pipe string to the walls of the well bore. Hydraulic cement compositions also are used in such remedial cementing operations as plugging highly permeable zones or fractures in well bores, plugging cracks and holes in pipe strings, and the like.

Often the hydraulic cement must be placed within or next to a porous medium, for example earth strata surrounding the wellbore. In such a circumstance, water tends to filter out of the slurry and into the strata during placement prior to setting of the cement. A number of difficulties arise from an uncontrolled fluid loss of this type. Such difficulties include an uncontrolled setting rate, improper placement of the slurry, impaired strength properties, and contamination of the surrounding strata. Excessive fluid loss, inter alia, causes a cement composition to be prematurely dehydrated, which may limit the amount of cement composition that can be pumped and subsequently the time allowable for the pumping operation. This may also decrease the compressive strength of the cement composition and negatively impact bond strength between the desired cement composition and a subterranean zone, the walls of pipe string and/or the walls of the well bore. These conditions are all undesirable in oil and gas well cementing operations.

In order for such well cementing operations to be successful, the cement compositions utilized may include a fluid loss control component to reduce the loss of fluid, for example, water, from the cement compositions when they contact permeable subterranean formations and zones. The effectiveness of a fluid loss additive is often related to the size or the molecular weight of the polymer. A "large" polymer, or a polymer with a higher molecular weight, generally is more effective in preventing excessive fluid loss from a cement slurry than a "small" polymer, or a polymer with a lower molecular weight. However, large polymers have a negative impact on the properties of the cement slurry. The most common problem associated with large polymers as additives is an unwanted and deleterious increase in viscosity of the cement slurry. Cement fluid loss additives are needed which prevent excessive fluid loss that also impart little or no added viscosity to the cement slurry.

Drilling fluid are fluids used during the drilling process of subterranean wells, in which the fluids provide primary well control of subsurface pressures by a combination of density and any additional pressure acting on the fluid column (annular or surface imposed). They are most often circulated down the drilling string, out the bit and back up the annulus to the surface so that drill cuttings are removed from the wellbore. Drilling fluid carries a lengthy list of functions including wellbore pressure management, drill cuttings removal from drill bit to the surface via circulation; drill cuttings (and weight materials) suspension while in stand-still mode, wellbore stability maintenance both in mechanical and chemical perspectives, hydraulic energy transmission to drill bit and other downhole tools, lubricate and cool the drill string and bit, provision for sufficient formation evaluation, and provision of a completed wellbore including a thin and tough filter cake with low permeability across permeability formation for subsequent production phase. However, these conventional drilling fluid still produce unsatisfactory results.

Thus, an ongoing need exists for improved cementitious and drilling fluid additives and methods of utilizing same.

SUMMARY

The embodiments described herein generally relate to methods and chemical compositions for use in wellbore treatment processes. In one embodiment, a composition for use with a cementing process is provided comprising an aqueous insoluble lignin.

In one embodiment, a composition for use with a cementing process is provided comprising an aqueous insoluble lignin and a fluid loss additive. The fluid loss additive may include a random tetracopolymer having the formula styrene-butadiene-acrylic-fumaric acid, a polyvinyl acetate, and a surfactant composition.

In one embodiment, a composition is provided comprising a cementitious material, a drilling fluid, or combinations thereof, and an additive composition comprising one or more components selected from the group of an aqueous insoluble lignin, a coke fine, a random tetracopolymer having the formula styrene-butadiene-acrylic-fumaric acid, a polyvinyl acetate, a surfactant composition, and combinations thereof.

In another embodiment, a composition is provided comprising an aqueous insoluble lignin, a coke fine, a random tetracopolymer having the formula styrene-butadiene-acrylic-fumaric acid, a polyvinyl acetate, a surfactant composition, and combinations thereof.

In another embodiment, a process is provided for using a composition, comprising providing a composition comprising one or more components selected from the group of an aqueous insoluble lignin, a coke fine, a random tetracopolymer having the formula styrene-butadiene-acrylic-fumaric acid, a polyvinyl acetate, a surfactant composition, and combinations thereof, and depositing the composition downhole of a wellbore.

The features, functions, and advantages that have been discussed can be achieved independently in various embodiments or may be combined in yet other embodiments, further details of which can be seen with reference to the following description and drawings.

DETAILED DESCRIPTION

The embodiments described herein generally relate to methods and chemical compositions for use with wellbore treatment processes. In one embodiment, a composition for use with a cementing process is provided comprising an additive composition comprising one or more components selected from the group of an aqueous insoluble lignin, a coke fine, a random tetracopolymer having the formula styrene-butadiene-acrylic-fumaric acid, a polyvinyl acetate, a surfactant composition, and combinations thereof. In a further embodiment, the composition comprises a cementitious material, a drilling fluid, or combinations thereof, and the additive composition. In one embodiment, the additive composition comprises an aqueous insoluble lignin, a coke fine, a random tetracopolymer having the formula styrene-butadiene-acrylic-fumaric acid, a polyvinyl acetate, a surfactant composition, and combinations thereof.

The additive composition may be use for cementitious processes for wellbore treatment processes. In one embodiment, the composition is related to the wellbore cementing process in which the slurry fluid loss to the porous formation is minimized. The additive composition may also be related to the prevention of formation gases from migrating into the cured cement mass. The additive composition may also be related to effective mitigation of air or other gas entrainment in the slurry bulk that often takes place as a result of high speed blending.

The additive composition may be use for drilling fluid processes for wellbore treatment processes. The main functions of drilling fluids include providing hydrostatic pressure to prevent formation fluids from entering into the well bore, keeping the drill bit cool and clean during drilling, carrying out drill cuttings, and suspending the drill cuttings while drilling is paused and when the drilling assembly is brought in and out of the hole. The drilling fluid used for a particular job is selected to avoid formation damage and to limit corrosion.

The additive composition may be free of water. In one embodiment, the additive composition components may be selected from a diverse group of materials that are aqueous insoluble.

In one embodiment, the composition may be deployed either in the form of a pre-mix with the cementitious materials (including slurries) or as a self-contained pre-flush pad. In one embodiment, the additive composition may be deployed either in the form of a pre-mix with the drilling fluid.

In one embodiment, a composition is provided comprising a cementitious material, a drilling fluid, or combinations thereof, and an additive composition comprising one or more components selected from the group of an aqueous insoluble lignin, a coke fine, a random tetracopolymer having the formula styrene-butadiene-acrylic-fumaric acid, a polyvinyl acetate, a surfactant composition, and combinations thereof.

Cementitious materials include one or materials selected from the group consisting of cement, fly ash, clay, silica flour, and combinations thereof. In one example, the cementitious composition may include Portland cement and class 1 fly ash. In one example, the cementitious composition may include Portland cement and class 1 fly ash. Additionally, the cementitious materials may include water and be in the form of a slurry.

In a cementitious materials composition, the cementitious material comprises from about 90 wt. % to about 99.9 wt. % by weight, such as from about 95 wt. % to about 99.75 wt. % by weight of cementitious materials composition; and the additive composition comprises from about 0.1 wt. % to about 10 wt. % by weight, such as from about 0.25 wt. % to about 5 wt. % by weight of cementitious materials composition.

Liquid drilling fluid is often called drilling mud. The three main categories of drilling fluids are water-based muds (which can be dispersed and non-dispersed), non-aqueous muds, usually called oil-based mud, and gaseous drilling fluid, in which a wide range of gases can be used.

Drilling fluids include air, water, polymers (such as foaming agents), water-based muds, oil-based mud, synthetic-based fluid, and combinations thereof, all of which are known to one skilled in the art. Oil-based muds include muds where the base fluid is a petroleum product such as diesel fuel. Synthetic-based fluids include muds where the base fluid is a synthetic oil. In one embodiment, a water-based mud may comprise water and clay (usually a combination of native clays), such as bentonite. Other chemicals, for example, potassium formate, may be added to the water-based mud to achieve various effects, including: viscosity control, shale stability, enhance drilling rate of penetration, cooling and lubricating of equipment. Typical additives for liquid drilling fluids include weighting materials, viscosifiers, filtration control additives, pH/alkalinity control chemicals, dispersants/deflocculants/thinners, surfactants and emulsifiers, shale inhibitors, corrosion inhibitors/oxygen scavengers/hydrogen sulfide scavengers, lubricants, and fluid loss and loss of circulation control agents, and combinations thereof.

In a drilling fluid composition, the drilling fluid comprises from about 90 wt. % to about 99.9 wt. % by weight, such as from about 95 wt. % to about 99.75 wt. % by weight of drilling fluid composition; and the additive composition comprises from about 0.1 wt. % to about 10 wt. % by weight, such as from about 0.25 wt. % to about 5 wt. % by weight of drilling fluid composition.

Lignin is a biopolymer of cross-linked phenolic polymers with a weight average molecular weight range between 500 to 750,000 Daltons, such as 1,000 to 30,000 Daltons. In one embodiment, lignin includes amorphous polyphenolic material arising from enzyme-mediated dehydrogenative polymerization of three randomly crosslinked polymers comprising of phenylpropanoid monomer moieties, including coniferyl, sinapyl and p-coumaryl alcohol.

There are two principal categories of ligneous materials: sulfur bearing and sulfur-free. An example of a sulfur bearing lignin is lignosulfonate, and an example of a sulfur-free lignin is a Kraft lignin. Kraft lignin is typically obtained by treating the wood at elevated temperatures above 340° F. in concentrated alkaline such as NaOH solution. Sulfur bearing lignosulfonate is aqueous soluble up to 200 g/L at 77° F. within a neutral or alkaline pH domain, a pH from about 7 to 14, while the sulfur free (Kraft) lignin has a water solubility less than 0.1 g/L under otherwise identical conditions. As defined herein, aqueous insoluble lignin is lignin having a solubility less than 0.1 g/L at 77° F. within the neutral or alkaline pH domain.

Any suitable aqueous insoluble lignin can be used in the present invention. Suitable examples include Kraft lignins, pyrolytic lignins (solid residue from pyrolysis process), organosolv lignins, soda-ash lignins, and combinations thereof. Alternatively, the composition is free of sulfur bearing lignins. The aqueous insoluble lignin has a weight average molecular weight range between 500 to 750,000 Daltons.

In one embodiment of an additive composition if the aqueous insoluble lignin is present, the aqueous insoluble lignin may comprise from about 0.1 wt. % to about 99.7 wt. %, from about 0.1 wt. % to about 99.6 wt. %, from about 0.1 wt. % to about 50 wt. %, such as from about 0.1 wt. % to about 30 wt. %, for example, from about 0.5 wt. % to about 10 wt. % of such an additive composition.

In one embodiment of the additive composition of the cementitious materials composition or the drilling fluid composition, the additive composition comprises the aqueous insoluble lignin. The additive composition comprises from about 0.1 wt. % to about 10 wt. %, such as from about 0.25 wt. % to about 5.0 wt. % by weight, for example, from about 0.35 wt. % to about 4.5 wt. % of the cementitious materials composition or the drilling fluid composition.

In one embodiment, coke fines are particles of solid carbonaceous material that may include bituminous coal, anthracite coal, lignite coal, graphite and petroleum coke. Two types of finely ground carbonaceous materials are suitable, including cokes originated from certain coals, and certain oil-derived cokes. In general, cokes are made by heating carbonaceous precursors in the absence of oxygen resulting in little or no volatile residues. The cokes may have either very high porosity (like activated carbons), or very low porosity (like shot cokes and needle cokes). The preferred coal-derived cokes are made from bituminous coals, although cokes sourced from brown coal (lignite), sub-bituminous, semi-bituminous, and anthracite coals are also suitable. The preferred oil-derived cokes are made by treatment of petroleum, heavy oil, or oil from tar sands, oil sands, or oil shales by the continuous fluidized bed process. Cokes made from these precursors by delayed coking are also suitable, especially green sponge coke. However, calcined oil-derived cokes are less preferred. Coke fine comprise from 85% to about 100% by weight of carbon, and may include other elements including sulfur and metals, such as vanadium, among other elements.

Typically, the coke particle size range is preferably from about 0.1 to 750 microns, more preferably from about 40 to 400 microns, and most preferably from about 100 to 200 microns. An example of a suitable material has less than 1% larger than 60 mesh (250 microns) and less than 10% smaller than 170 mesh (90 microns).

In one embodiment of an additive composition if the coke fines are present, the coke fines may comprise from about 0.1 wt. % to about 99.7 wt. %, from about 0.1 wt. % to about 99.6 wt. %, from about 0.1 wt. % to about 40 wt. %, such as from about 0.1 wt. % to about 30 wt. %, for example, from about 0.5 wt. % to about 10 wt. % of such an additive composition.

In one embodiment of the additive composition of the cementitious materials composition or the drilling fluid composition, the additive composition comprises coke fines, and the additive composition comprises from about 0.1 wt. % to about 10 wt. %, such as from about 0.25 wt. % to about 5.0 wt. % by weight, for example, from about 0.35 wt. % to about 4.5 wt. % of the cementitious materials composition or the drilling fluid composition.

In an alternative embodiment, the additive composition may be free of the aqueous insoluble lignin, may be free of the coke fines, of free of both.

In one embodiment, the additive composition may comprise a random tetracopolymer having the formula styrene-butadiene-acrylic-fumaric acid, polyvinyl acetate, a surfactant composition, or combinations thereof. The surfactant composition may include one or more nonionic surfactants.

In one embodiment of an additive composition if the random tetracopolymer is present, the random tetracopolymer may comprise from about 0.1 wt. % to about 99.7 wt. %, from about 0.1 wt. % to about 99.6 wt. %, from about 0.1 wt. % to about 30 wt. %, such as from about 0.1 wt. % to about 25 wt. %, for example, from about 0.5 wt. % to about 15 wt. % of such an additive composition.

In one embodiment of the additive composition of the cementitious materials composition or the drilling fluid composition, the additive composition comprises the random tetracopolymer, and the additive composition comprises from about 0.1 wt. % to about 10 wt. %, such as from about 0.25 wt. % to about 5.0 wt. % by weight, for example, from about 0.35 wt. % to about 4.5 wt. % of the cementitious materials composition or the drilling fluid composition.

In another embodiment, the additive composition may comprise from about 1.0 wt. % to about 80 wt. %, such as from about 5.0 wt. % to about 60 wt. %, of the random tetracopolymer, from about 5.0 wt. % to about 90 wt. %, such as from about 7.5 wt. % to about 70 wt. %, of polyvinyl acetate, and from about 2.0 wt. % to about 50 wt. %, such as from about 5.0 wt. % to about 45 wt. %, of the surfactant composition in the absence of the coke fines, the aqueous insoluble lignin, or both.

The random tetracopolymer comprises monomers of styrene, butadiene, acrylic acid, and fumaric acid.

In one embodiment, the random tetracopolymer may include from about 25 to about 75 wt % (weight percent) of styrene monomer, from about 10 to about 40 wt % of butadiene monomer, from about 1 to about 10 wt % of acrylic acid monomer, from about 1 to about 10 wt % of fumaric acid monomer, wherein the total amount of the monomers is 100%.

The random tetracopolymer may have a molecular weight range from about 10,000 to about 5,000,000 Dalton, such as from about 25,000 to about 3,000,000 Dalton, for example, from about 50,000 to about 2,000,000 Dalton. The random tetracopolymer may be water insoluble. The random tetracopolymer may be in a powder form. The powder form may have a size distribution range from about 10 to about 500 microns, such as or from about 50 to about 250 microns, for example, from about 100 to about 200 microns. The powder form may also be a combination of multi-modal solid forms including sphere, rod, oval, fiber, flake, sheet, star, and star, and any other geometric form, or a multimodal mixture thereof. The aspect ratio of such powders is in the range of 1:1000, or 1:500, or 1:100, or 1:50, or 1:10, or 1:5, or 1:2.5, or 1:1. The aspect ratio is used herein to describe the ratio of the X and Y dimensions of a 2-dimensional object (sheet), or the projection of a 3-dimensional object (particle). In addition to a 1:1 ratio particle, for example, a spherical powder, the aspect ratio also covers other geometries of solid objects including fiber and/or rod.

The polyvinyl acetate may have a molecular weight range from about 10,000 to about 5,000,000 Dalton, such as from about 25,000 to about 3,000,000 Dalton, for example, from about 50,000 to about 2,000,000 Dalton. The polyvinyl acetate may be water insoluble. The polyvinyl acetate may be in a powder form. The powder form may have a size distribution range from about 10 to about 500 microns, such as or from about 50 to about 250 microns, for example, from about 100 to about 200 microns. The powder form may also be a combination of multi-modal solid forms including sphere, rod, oval, fiber, flake, sheet, star, and star, and any other geometric form, or a multimodal mixture thereof. The aspect ratio of such powders is in the range of 1:1000, or 1:500, or 1:100, or 1:50, or 1:10, or 1:5, or 1:2.5, or 1:1. The aspect ratio is used herein to describe the ratio of the X and Y dimensions of a 2-dimensional object (sheet), or the projection of a 3-dimensional object (particle). In addition to a 1:1 ratio particle, for example, a spherical powder, the aspect ratio also covers other geometries of solid objects including fiber and/or rod.

The polyvinyl acetate may be substituted in part or in whole by another polymer material selected from the group consisting of poly(vinyl alcohol), poly(vinyl benzoate), poly(vinyl butyral), poly(vinyl butyrate), poly(vinyl formal), poly(vinyl formate), poly(vinyl propionate), poly(vinyl stearate), and combinations thereof. In addition, one or more ureaformaldehyde, melamineformaldehyde, melamineureaformaldehyde and phenolformaldehyde, or derivatives thereof, may be used in part or in whole of the polyvinyl acetate.

In one embodiment of an additive composition if the polyvinyl acetate is present, the polyvinyl acetate may comprise from about 0.1 wt. % to about 99.7 wt. %, from about 0.1 wt. % to about 99.6 wt. %, from about 0.1 wt. % to about 30 wt. %, such as from about 0.1 wt. % to about 25 wt. %, for example, from about 0.5 wt. % to about 10 wt. % of such an additive composition.

In one embodiment of the additive composition of the cementitious materials composition or the drilling fluid composition, the additive composition comprises polyvinyl acetate, and the additive composition comprises from about 0.1 wt. % to about 10 wt. %, such as from about 0.25 wt. % to about 5.0 wt. % by weight, for example, from about 0.35 wt. % to about 4.5 wt. % of the cementitious materials composition or drilling fluid composition.

The random tetracopolymer and the polyvinyl acetate may be present in the additive composition at a mass ratio from about 1:10 to about 10:1, such as from about 1:5 to about 5:1, for example, from about 1:2.5 to about 2.5:1.

The surfactant composition may include one or more nonionic surfactants. The nonionic surfactant may be selected from the group consisting of an alkyl ethoxylate, alkyl polyglucoside, a polyamine-ethoxylated diamine, an alkylpropoxylated amine, a fatty alcohol, an alkylamide monoethanolamine, an alkylamide diethanolamine, an alkyldialkylamine oxide, an alkylamide, an ethoxylated amide alkoxylated alkyl phenol, an alkoxylated alcohol, a polyol, a polyol ester, an alkyliminodipropionate disodium, an alkylamphodiacetate disodium, an alkylampho hydroxypropyl sulfonate sodium, an alkylamidopropylhydroxysultaine, a lecithin, polyether derivated from polyethylene oxide or polypropylene oxide and combinations thereof. Examples of suitable nonionic surfactants include polyoxyethylene dodecyl mono ether, polyoxyethylene monolaurate, polyoxyethylene monohexadecyl ether, polyoxyethylene monooleate, polyoxyethylene mono(cis-9-octadecenyl) ether, polyoxyethylene monostearate, polyoxyethylene monooctadecyl ether, polyoxyethylene dioleate, polyoxyethylene distearate, and combinations thereof.

The nonionic surfactant may be disposed in a microporous carrier. The microporous carrier may be selected from the group of kaolin flake, glutamate salt, calcium carbonate, and combinations thereof. Loading level is the range of surfactant loading level or concentration in the microporous carrier.

If kaolin flake is used as the microporous carrier, the surfactant has a loading level from about 1 to about 25 wt % of the microporous carrier. In one embodiment, the kaolin flake may have a size distribution range from about 10 to about 500 microns, such as from about 50 to about 250 microns, for example from about 100 to about 200 microns. The aspect ratio of the flake is in the range of about 1:1000, or about 1:500, or about 1:100, or about 1:50, or about 1:10, or about 1:5, or 1:2.5, or about 1:1.

If glutamate salt is used as the microporous carrier, the surfactant has a loading level from about 1 to about 25 wt % of the microporous carrier. The glutamate salt may be selected from the group of sodium glutamate, potassium glutamate, lithium glutamate, ammonium glutamate, calcium glutamate, magnesium glutamate, and combinations thereof. In one embodiment, the glutamate salt is in the form of a flake, which flake may have a size distribution range from about 10 to about 500 microns, such as from about 50 to about 250 microns, for example from about 100 to about 200 microns. The aspect ratio of the flake is in the range of about 1:1000, or about 1:500, or about 1:100, or about 1:50, or about 1:10, or about 1:5, or 1:2.5, or about 1:1.

If calcium carbonate is used as the microporous carrier, the surfactant has a loading level from about 1 to about 25 wt % of the microporous carrier. In one embodiment, the calcium carbonate is in the form of a flake, which flake may have a size distribution range from about 10 to about 500 microns, such as from about 50 to about 250 microns, for example from about 100 to about 200 microns. The aspect ratio of the flake is in the range of about 1:1000, or about 1:500, or about 1:100, or about 1:50, or about 1:10, or about 1:5, or 1:2.5, or about 1:1.

Optionally, an ionic surfactant may be used with the nonionic surfactant in the surfactant composition. If used, the ionic surfactant may be selected from the group consisting of sodium and potassium salts of straight-chain fatty acids, polyoxyethylenated fatty alcohol carboxylates, linear alkyl benzene sulfonates, alpha olefin sulfonates, sulfonated fatty acid methyl ester, arylalkanesulfonates, sulfosuccinate esters, alkyldiphenylether(di)sulfonates, alkylnaphthalenesulfonates, isoethionates, alkylether sulfates, sulfonated oils, fatty acid monoethanolamide sulfates, polyoxyethylene fatty acid monoethanolamide sulfates, aliphatic phosphate esters, nonylphenolphosphate esters, fluorinated anionics, quaternary ammonium and combinations thereof. They can be either sodium bis(2-ethylhexyl) sulfosccinate (AOT), or didodecyldimethylammonium bromide (DDAB), or dodecyltrimethyl ammonium bromide (DTAB), or sodium dodecyl sulfate (SDS), or erucyl bis(2-hydroxyethyl) methyl ammonium chloride. The ionic surfactant has a loading level from about 1 to about 25 wt % of the microporous carrier.

In one embodiment, the surfactant disposed (infused) in a microporous carrier may be made by using a wet chemistry method, wherein the surfactant is mixed according to predetermined mass into an aqueous medium containing predetermined amount of microporous carrier, stirred at ambient temperature for a period of time, such as up to 120 minutes. Next the aqueous solution is dried in a desiccator under reduced pressure at ambient temperature, until the powders are free from apparent water.

In one embodiment of an additive composition if the surfactant is present, the surfactant may comprise from about 0.1 wt. % to about 99.7 wt. %, from about 0.1 wt. % to about 99.6 wt. %, from about 0.1 wt. % to about 10 wt.

%, such as from about 0.1 wt. % to about 3 wt. %, for example, from about 0.25 wt. % to about 2.5 wt. % of such an additive composition.

In one embodiment of the additive composition of the cementitious materials composition or the drilling fluid composition, the additive composition comprises surfactant composition, and the additive composition comprises from about 0.1 wt. % to about 10 wt. %, such as from about 0.25 wt. % to about 5.0 wt. % by weight, for example, from about 0.35 wt. % to about 4.5 wt. % of the cementitious materials composition or drilling fluid composition.

Alternatively, the entire composition of the tetracopolymer, polyvinyl acetate and surfactant may be disposed or infused in the microporous carrier. In such an embodiment, the compositions has a loading level from about 1 to about 25 wt % of the microporous carrier.

Further alternatively, the additives may be infused into the selected microporous network of the carrier using a wet chemistry method, wherein the additives containing the tetracopolymer, polyvinyl acetate and surfactant are mixed according to predetermined mass ratio into an aqueous medium containing predetermined amount of microporous carrier, stirred at ambient temperature for a period of time, such as up to 120 minutes. Next the aqueous solution is dried in a desiccator under reduced pressure at ambient temperature, until the powders are free from apparent water.

The composition of the aqueous insoluble lignin and a fluid loss additive, the aqueous insoluble lignin may further include one or more additives selected from the group consisting of defoaming agent, dispersant, free water control agent, and combinations thereof.

In one embodiment, a composition is provided comprising an aqueous insoluble lignin, a coke fine, a random tetracopolymer having the formula styrene-butadiene-acrylic-fumaric acid, a polyvinyl acetate, a surfactant composition, and combinations thereof.

In one embodiment, such a composition comprises: from about 0.1 to about 99.6 wt % of aqueous insoluble lignin;
from about 0.1 to about 99.6 wt % coke fine;
from about 0.1 to about 99.6 wt % of the random tetracopolymer;
from about 0.1 to about 99.6 wt % of the polyvinyl acetate; and from about 0.1 to about 99.6 wt % of the surfactant composition, where the total wt. % is 100 wt. % of the composition.

In one embodiment, such a composition comprises: from about 0.1 to about 99.7 wt % of the aqueous insoluble lignin;
from about 0.1 to about 99.7 wt % of the random tetracopolymer;
from about 0.1 to about 99.7 wt/o of the polyvinyl acetate; and
from about 0.1 to about 99.7 wt % of the surfactant composition, wherein the total wt. % is 100 wt. % of the composition.

In one embodiment, such a composition comprises:
from about 0.1 to about 99.7 wt % of the coke fines;
from about 0.1 to about 99.7 wt % of the random tetracopolymer;
from about 0.1 to about 99.7 wt % of the polyvinyl acetate; and
from about 0.1 to about 99.7 wt % of the surfactant composition, wherein the total wt. % is 100 wt. % of the composition.

The composition of the cementitious materials and additive composition may be blended into a cement slurry at a pre-defined loading level, such as described herein, and pumped together through a wellbore. Alternatively, the composition of the cementitious materials and additive composition may be blended in water as dispersions and pumped through the wellbore as a pre-flush material.

In one embodiment, the composition of the cementitious materials and additive composition, the composition is pumped downhole of a wellbore for the application of cement slurry foaming control. In one embodiment, the composition of the cementitious materials and additive composition described herein is pumped downhole of a wellbore for the application of cement slurry fluid loss control. In one embodiment, the composition described herein is pumped downhole of a wellbore for the application of cement body gas migration control. In one embodiment, the composition described herein is pumped downhole of a wellbore premixed with cement or a cement slurry. In one embodiment, the composition described herein is pumped downhole of a wellbore as a pre-flush in front of cement or a cement slurry.

In one embodiment, the composition of the cementitious materials and additive composition is an oil/gas well drilling fluid composition. In one embodiment, the composition of the cementitious materials and additive composition is an oil/gas well fracturing fluid composition. In one embodiment, the composition of the cementitious materials and additive composition is a hydrothermal well drilling fluid composition.

EXAMPLES

Aspects and advantages of the embodiments described herein are further illustrated by the following examples. The particular materials and amounts thereof, as well as other conditions and details, recited in these examples should not be used to limit the embodiments described herein. All parts and percentages are by weight unless otherwise indicated.

For the following examples, the additive composition is 30 wt. % of kraft lignin, 25 wt. % of coke fine, 20 wt. % of tetracopolymer, 20% polyvinyl acetate, and 5.0 wt. % surfactant.

The blending procedure for the compositions is as follows. In an API compliant test, the components were blended into the water at 4000 rpm for 15 seconds, followed at 12,000 rpm for 35 seconds.

The viscosities of the slurry were measured at ambient temperatures using a FANN 35 viscometer (obtained from FANN Instrument Co. Houston, Tex., adapting a configuration of R1-B1-F1 rotor-bob-torsion spring combination) at 3, 100 and 300 rpm respectively. The slurry was then transferred into a stirred fluid loss tester (acquired from OFI Testing Equipment, Houston, Tex.) for conditioning over 15 minutes at 150 rpm, under an inert atmosphere of N2 at 500 psi, while heating up to 200° F. Given that the mass of the cement slurry is insignificant in comparison to that of the stainless steel cell, it is considered that the thermal couple probe inserted deep into the cell wall indicates the genuine temperature of the slurry, which is under constant stirring of 150 rpm during the conditioning period. Next a pressure differential of 1000 psi was applied to the cement slurry, and filtrate samples were taken at certain intervals up to a period of 30 minutes. The volume of filtrate collected over the period was recorded.

Table 1 following the examples includes a summary of the amounts of components, and the measured viscosities for the compositions at different rpms.

Example 1: Lignin-Free Control Sample

A cement slurry was prepared according to the following composition as shown in Table 1 below, which contains 333 g cement H (obtained from Lafarge Cement, Joppa, Ill.), 141 g fly ash c (obtained from Headwaters Resources, Thompsons, Tex.), 52 g bentonite (obtained from Sigma-Aldrich Co.), and 9.6 g of an additive composition of a fluid loss additive package including 2.4 g styrene butadiene copolymer containing minor acrylic and fumaric moieties under Hexion tradename PSB150, 2.4 g polyvinyl acetate under Hexion tradename UP600B, 4.8 g calcium carbonate flake embedded with surfactant under Hexion tradename Xair P, blended in 468 g Houston tap water. The slurry viscosities were taken at ambient temperature for three shear rates: 3, 100 and 300 rpm, respectively. The slurry was then run at 200° F. resulting in a total fluid loss of 196 ml, corresponding closely to the key specifications of the commercially practiced light weight (12.6 ppg) slurry aimed at shallow well lead cementing operations.

Example 2: Lignin and Fluid Loss Additive Sample

A cement slurry was prepared according to the following composition as shown in table 3 below, which contains 333 g cement H (obtained from Lafarge Cement, Joppa, Ill.), 141 g fly ash c (obtained from Headwaters Resources, Thompsons, Tex.), 52 g bentonite (obtained from Sigma-Aldrich Co.) plus 7.2 g (75% of the original dosage) of an additive composition including 1.8 g styrene butadiene copolymer containing minor acrylic and fumaric moieties under Hexion tradename PSB150, 21.8 g polyvinyl acetate under Hexion tradename UP600B, 3.6 g calcium carbonate flake embedded with surfactant under Hexion tradename Xair P, and 9.6 g Kraft lignin (obtained from Hinton Pulp, a division of West Fraser Mills Ltd., Hinton, AB) was blended in with 468 g Houston tap water. The slurry viscosities were taken at ambient temperature for three shear rates: 3, 100 and 300 rpm, respectively. The slurry was then run at 200° F. resulting in a total fluid loss of 27 ml, representing a significant improvement in the crucial fluid loss control performance of this commercially practiced light weight (12.6 ppg) slurry aimed at shallow well lead cementing operations.

Example 3

A cement slurry was prepared according to the following composition as shown in table 5 below, which contains 333 g cement H (obtained from Lafarge Cement, Joppa, Ill.), 141 g fly ash c (obtained from Headwaters Resources, Thompsons, Tex.), 52 g bentonite (obtained from Sigma-Aldrich Co.) plus 3.6 g (37.5% of the original dosage as shown in example 1) of an additive composition including 0.9 g styrene butadiene copolymer containing minor acrylic and fumaric moieties under Hexion tradename PSB150, 0.9 g polyvinyl acetate under Hexion tradename UP600B, 1.8 g calcium carbonate flake embedded with surfactant under Hexion tradename Xair P, and 9.6 g Kraft lignin (obtained from Hinton Pulp, a division of West Fraser Mills Ltd., Hinton, AB) was blended in with 468 g Houston tap water. The slurry viscosities were taken at ambient temperature for three shear rates: 3, 100 and 300 rpm, respectively. The slurry was then run at 200° F. resulting in a total fluid loss of 86 ml, still representing a substantial gain in the crucial fluid loss control performance of this commercially practiced light weight (12.6 ppg) slurry aimed at shallow well lead cementing operations.

Example 4

A cement slurry was prepared according to the following composition as shown in table 7 below, which contains 333 g cement H (obtained from Lafarge Cement, Joppa, Ill.), 141 g fly ash c (obtained from Headwaters Resources, Thompsons, Tex.), 52 g bentonite (obtained from Sigma-Aldrich Co.) plus 3.6 g (37.5% of the original dosage as shown in example 1) of the additive composition including 0.9 g styrene butadiene copolymer containing minor acrylic and fumaric moieties under Hexion tradename PSB150, 0.9 g polyvinyl acetate under Hexion tradename UP600B, 1.8 g calcium carbonate flake embedded with surfactant under Hexion tradename Xair P, and a reduced loading of 4.8 g Kraft lignin (obtained from Hinton Pulp, a division of West Fraser Mills Ltd., Hinton, AB) was blended in with 468 g Houston tap water. The slurry viscosities were taken at ambient temperature for three shear rates: 3, 100 and 300 rpm, respectively, as shown in table 8. The slurry was then run at 200° F. resulting in a total fluid loss of 123 ml, still representing a substantial gain in the crucial fluid loss control performance of this commercially practiced light weight (12.6 ppg) slurry aimed at shallow well lead cementing operations.

Example 5

A cement slurry was prepared according to the following composition as shown in table 9 below, which contains 333 g cement H (obtained from Lafarge Cement, Joppa, Ill.), 141 g fly ash c (obtained from Headwaters Resources, Thompsons, Tex.), 52 g bentonite (obtained from Sigma-Aldrich Co.) plus 9.6 g of an additive composition of including 2.4 g styrene butadiene copolymer containing minor acrylic and fumaric moieties under Hexion tradename PSB150, 2.4 g polyvinyl acetate under Hexion tradename UP600B, 4.8 g calcium carbonate flake embedded with surfactant under Hexion tradename Xair P, and 4.8 g Kraft lignin (obtained from Hinton Pulp, a division of West Fraser Mills Ltd., Hinton, AB) was blended in with 468 g Houston tap water. The slurry viscosities were taken at ambient temperature for three shear rates: 3, 100 and 300 rpm. The slurry was then run at 200° F. resulting in a total fluid loss of 35 ml, representing a significant gain in the crucial fluid loss control performance of this commercially practiced light weight (12.6 ppg) slurry aimed at shallow well lead cementing operations.

Example 6: Fluid Loss Additive-Free Comparison Sample

A cement slurry was prepared according to the following composition as shown in table 11 below, which contains 333 g cement H (obtained from Lafarge Cement, Joppa, Ill.), 141 g fly ash c (obtained from Headwaters Resources, Thompsons, Tex.), 52 g bentonite (obtained from Sigma-Aldrich Co.) plus 19.2 g (4% BWOC) Kraft lignin (obtained from Hinton Pulp, a division of West Fraser Mills Ltd., Hinton, AB) were blended in with 468 g Houston tap water. The slurry viscosities were taken at ambient temperature for three shear rates: 3, 100 and 300 rpm, respectively. The slurry was then run at 200° F. resulting in a total fluid loss of 124 ml, representing a significant gain in the crucial fluid loss control performance of this commercially practiced light weight (12.6 ppg) slurry aimed at shallow well lead cementing operations. It demonstrates that using Kraft lignin alone, at sufficiently high dosage, can achieve certain extent of fluid loss control performance.

Example 7

A cement slurry was prepared according to the following composition as shown in table 13 below, which contains 333 g cement H (obtained from Lafarge Cement, Joppa, Ill.), 13.5 g bentonite (obtained from Sigma-Aldrich Co.) plus 6.8 g of an additive composition of including 2.6 g styrene butadiene copolymer containing minor acrylic and fumaric moieties under Hexion tradename PSB150, 2.6 g polyvinyl acetate under Hexion tradename UP600B, 1.6 g calcium carbonate flake embedded with surfactant under Hexion tradename Xair P, and 6.8 g Kraft lignin (obtained from Hinton Pulp, a division of West Fraser Mills Ltd., Hinton, AB) was blended in together with 330 g Houston tap water. The slurry viscosities were taken at ambient temperature for three shear rates: 3, 100 and 300 rpm, respectively, as shown in table 1. The slurry was then run at 200° F. resulting in a perfect zero ml fluid loss, representing a superb fluid loss control performance of this commercially practiced medium-to-heavy weight (15.5 ppg) slurry.

Example 8

A cement slurry was prepared according to the following composition as shown in table 13 below, which contains 335 g cement H (obtained from Lafarge Cement, Joppa, Ill.), 264 g fly ash c (obtained from Headwaters Resources, Thompsons, Tex.), 12 g bentonite (obtained from Sigma-Aldrich Co.), cement slurry setting retarder calcium lignosulfonate (obtained from Ritek Inc, Mckinney, Tex.), free water control agent cellosize 0.9 g (obtained from DOW Chemical Company via SigmaAldrich), plus a fluid loss additive package including 0.6 g styrene butadiene copolymer containing minor acrylic and fumaric moieties under Hexion tradename PSB150, 0.6 g polyvinyl acetate under Hexion tradename UP600B, 1.8 g calcium carbonate flake embedded with surfactant under Hexion tradename Xair P. In addition, a loading of 0.9 g Kraft lignin (obtained from Hinton Pulp, a division of West Fraser Mills Ltd., Hinton, AB) and coke fine 0.6 g (obtained from Ascend Performance Materials, Houston, Tex.), blended in together with 313 g Houston tap water. The slurry viscosities were taken at ambient temperature for three shear rates: 3, 100 and 300 rpm, respectively, as shown in table 14. The slurry was then run at 150° F. resulting in a 52 ml fluid loss, representing a superb fluid loss control performance of this commercially practiced medium weight (13.8 ppg) slurry.

The unique compositions disclosed in this invention represent significant development in the effective control of cementing fluid loss at substantially lower dosage than any known analogues. It will bring cost saving benefit to the indispensable cementing process in well construction stage. In addition, they also exhibit the potential of other additional structural benefits to cement body.

While the foregoing is directed to embodiments of the present disclosure, other and further embodiments of the disclosure may be devised without departing from the basic scope thereof, and the scope thereof is determined by the claims that follow.

What is claimed is:
1. A composition, comprising:
 a cementitious material, and
 an additive composition comprising:
  an aqueous insoluble lignin,
  a random tetracopolymer comprising monomers of styrene, butadiene, acrylic acid, and fumaric acid,
  a polyvinyl acetate, and
  a surfactant composition comprising a nonionic surfactant disposed in a microporous carrier.

2. The composition of claim 1, wherein the composition comprises:
 from about 90 wt. % to about 99.9 wt. % of the cementitious material; and
 from about 0.1 wt. % to about 10 wt. % of the additive composition.

3. The composition of claim 2, wherein the additive composition comprises from about 0.1 to about 50 wt % of the aqueous insoluble lignin.

4. The composition of claim 1, wherein the cementitious material comprises one or materials selected from the group consisting of cement, fly ash, clay, silica flour, and combinations thereof.

5. The composition of claim 1, wherein the cementitious material further comprises water and is in the form of a slurry.

6. The composition of claim 5, wherein the aqueous insoluble lignin comprises Kraft lignin.

7. The composition of claim 1, wherein the additive composition comprises:

TABLE 1

| Component | Ex. 1 | Ex. 2 | Ex. 3 | Ex. 4 | Ex. 5 | Ex. 6 | Ex. 7 | Ex. 8 |
|---|---|---|---|---|---|---|---|---|
| Additive composition (g)/with amount of Lignin (g) | 9.6/0 | 16.8/9.6 | 13.2/9.6 | 8.4/4.8 | 14.4/4.8 | 19.2/19.2 | 13.6/6.8 | 52.9/0.9 |
| Coke fine (g) | 0 | 0 | 0 | 0 | 0 | 0 | 0 | 0.6 |
| Cement H (g) | 333 | 333 | 333 | 333 | 333 | 333 | 678 | 335 |
| Fly Ash C (g) | 141 | 141 | 141 | 141 | 141 | 141 | 0 | 264 |
| Bentonite (g) | 52 | 52 | 52 | 52 | 52 | 52 | 13.5 | 12 |
| Water (g) | 468 | 468 | 468 | 468 | 468 | 468 | 330 | 313 |
| Viscosity (cP) at approx. 70° F. and FANN35/3 rpm | 1300 | 2500 | 2300 | 1900 | 1900 | 2000 | 1100 | 1950 |
| Viscosity (cP) at approx. 70° F. and FANN35/100 rpm | 153 | 186 | 171 | 165 | 141 | 166 | 150 | 165 |
| Viscosity (cP) at approx. 70° F. and FANN35/300 rpm | 78 | 81 | 71 | 74 | 64 | 78 | 80 | 80 | from about 0.1 to about 99.7 wt % of the aqueous insoluble lignin;

from about 0.1 to about 99.7 wt % of the random tetracopolymer;

from about 0.1 to about 99.7 wt % of the polyvinyl acetate; and from about 0.1 to about 99.7 wt % of the surfactant composition, wherein the total wt. % is 100 wt. % of the additive composition.

8. The composition of claim 1, wherein the aqueous insoluble lignin comprises Kraft lignin.

9. The composition of claim 1, further comprising one or more additives selected from the group consisting of defoaming agent, dispersant, free water control agent, and combinations thereof.

10. The composition of claim 1, wherein the surfactant composition further comprises an ionic surfactant.

* * * * *